(12) United States Patent
Maeda et al.

(10) Patent No.: US 6,274,946 B1
(45) Date of Patent: Aug. 14, 2001

(54) LEVER COMBINATION SWITCH UNIT

(75) Inventors: Shinji Maeda; Hirofumi Hayashi; Minoru Nishio; Kazunori Ushiroda, all of Aichi-ken (JP)

(73) Assignee: Kabushiki Kaisha Tokai-Rika-Denki-Seisakusho, Tokyo (JP)

( * ) Notice: Subject to any disclaimer, the term of this patent is extended or adjusted under 35 U.S.C. 154(b) by 0 days.

(21) Appl. No.: 09/288,242

(22) Filed: Apr. 8, 1999

(30) Foreign Application Priority Data

Apr. 15, 1998 (JP) .................................................. 10-104662

(51) Int. Cl.⁷ .................................................. B60R 25/10
(52) U.S. Cl. .................... 307/10.1; 343/711; 343/901; 455/129
(58) Field of Search ...................................... 307/10.1, 9.1, 307/10.2; 455/129; 343/900, 901, 711, 713; 340/534

(56) References Cited

U.S. PATENT DOCUMENTS

| | | | |
|---|---|---|---|
| 5,640,689 | * | 6/1997 | Rossi ..................................... 455/129 |
| 5,852,422 | * | 12/1998 | Imanishi ................................ 343/901 |
| 6,036,859 | * | 3/2000 | Flick ..................................... 307/10.2 |
| 6,078,293 | * | 6/2000 | Yamamoto ............................ 343/713 |

FOREIGN PATENT DOCUMENTS 7-312513 11/1995 (JP) .
8-268227 10/1996 (JP) .

* cited by examiner

Primary Examiner—Albert W. Paladini
(74) Attorney, Agent, or Firm—Oliff & Berridge, PLC

(57) ABSTRACT

A switch body has a wiper switch unit installed with a wiper operation lever, and a turn signal switch unit installed with a turn signal operation lever installed respectively therein. The switch body also has a CPU, a keyless reception circuit and an anti-burglar amplifier circuit incorporated therein. An antenna for the keyless reception circuit located within the wiper operation lever also functions as an antenna for the anti-burglar amplifier circuit.

10 Claims, 2 Drawing Sheets

LEVER COMBINATION SWITCH UNIT

INCORPORATION BY REFERENCE

The disclosure of Japanese Patent Application No. HEI 10-104662 filed on Apr. 15, 1998 including the specification, drawings and abstract is incorporated herein by reference in its entirety.

BACKGROUND OF THE INVENTION

1. Field of the Invention

The present invention relates to a lever combination switch unit installed around a steering wheel of a vehicle. More specifically, the present invention relates to a lever combination switch unit provided with an operation lever for operating a wiper unit or a turn signal unit of the vehicle.

2. Description of the Related Art

There has been a vehicle incorporating a keyless system in which an identification signal sent from a transmitter incorporated into an ignition key is received by a reception circuit and further decoded such that the door is locked/unlocked, the trunk is opened, the engine is started, and so forth. There also has been a vehicle incorporating an anti-burglar system which sounds an alarm or disconnects the starter circuit if an identification signal transmitted from the electronic key as the ignition key cannot be decoded so as to protect the vehicle from burglars.

In the aforementioned keyless system, electromagnetic waves are used for transmitting and receiving the identification signal. In the case where an obstacle exists between the transmitter and an antenna, the electromagnetic waves tend to shorten the operating distance of the keyless system, that is, the distance from the antenna which enables the reception of the identification signal. Furthermore, the keyless reception circuit or antenna is generally installed in places where it is difficult for the electronic wave from outside to reach the vehicle; for example, at the lower portion of the seat or inside the trunk. Therefore, there were cases where the operating distance of the keyless system would vary depending on the position of the ignition key around the vehicle.

Meanwhile the antenna for receiving the identification signal transmitted from the electronic key is positioned on the front surface of the ignition key cylinder. Accordingly, the antenna can also be used with the keyless system.

SUMMARY OF THE INVENTION

In conjunction with the foregoing problems, it is an object of the present invention to provide a lever combination switch unit that allows the operation distance of the keyless system to be maintained around the vehicle and reduces the cost by incorporating the circuits that constitute the keyless system and the anti-burglar system together.

According to the first aspect of the present invention, there is a lever combination switch unit including a switch body, an operation lever installed at either the right or left side of the switch body, and an antenna for a keyless reception circuit incorporated into the operation lever.

The lever combination switch unit according to the first aspect of this invention incorporates an antenna for a keyless reception circuit in an operation lever installed at either to the left or the right side of the switch body. As the antenna is positioned at an optimum location for receiving the electric waves, the operation distance of the keyless system is maintained around the vehicle.

According to the second aspect of the present invention, there is a lever combination switch unit of the first aspect in which an antenna for the keyless reception circuit is also used as an antenna for the anti-burglar amplifier circuit.

The lever combination switch unit according to the second aspect of the invention uses the antenna not only for the keyless reception circuit, but also for the anti-burglar system amplifier circuit. This allows the arrangement of the wire harness to be simplified as well as reduces the amount of space and number of man-hours required for incorporation.

According to the third aspect of the invention, the lever combination switch unit of the first aspect has either the aforementioned keyless reception circuit or the aforementioned anti-burglar amplifier circuit incorporated into the aforementioned switch body.

The lever combination switch unit according to the third aspect of the invention has both the keyless reception circuit and the anti-burglar amplifier circuit incorporated into the switch body. This allows the case for the circuit and the bracket for installation to be eliminated, and reduces the number of man-hours for incorporation, thus allowing for costs to be reduced.

DETAILED DESCRIPTION OF THE PREFERRED EMBODIMENTS

An embodiment of the present invention will be described with reference to the accompanying drawings.

Figure 1:
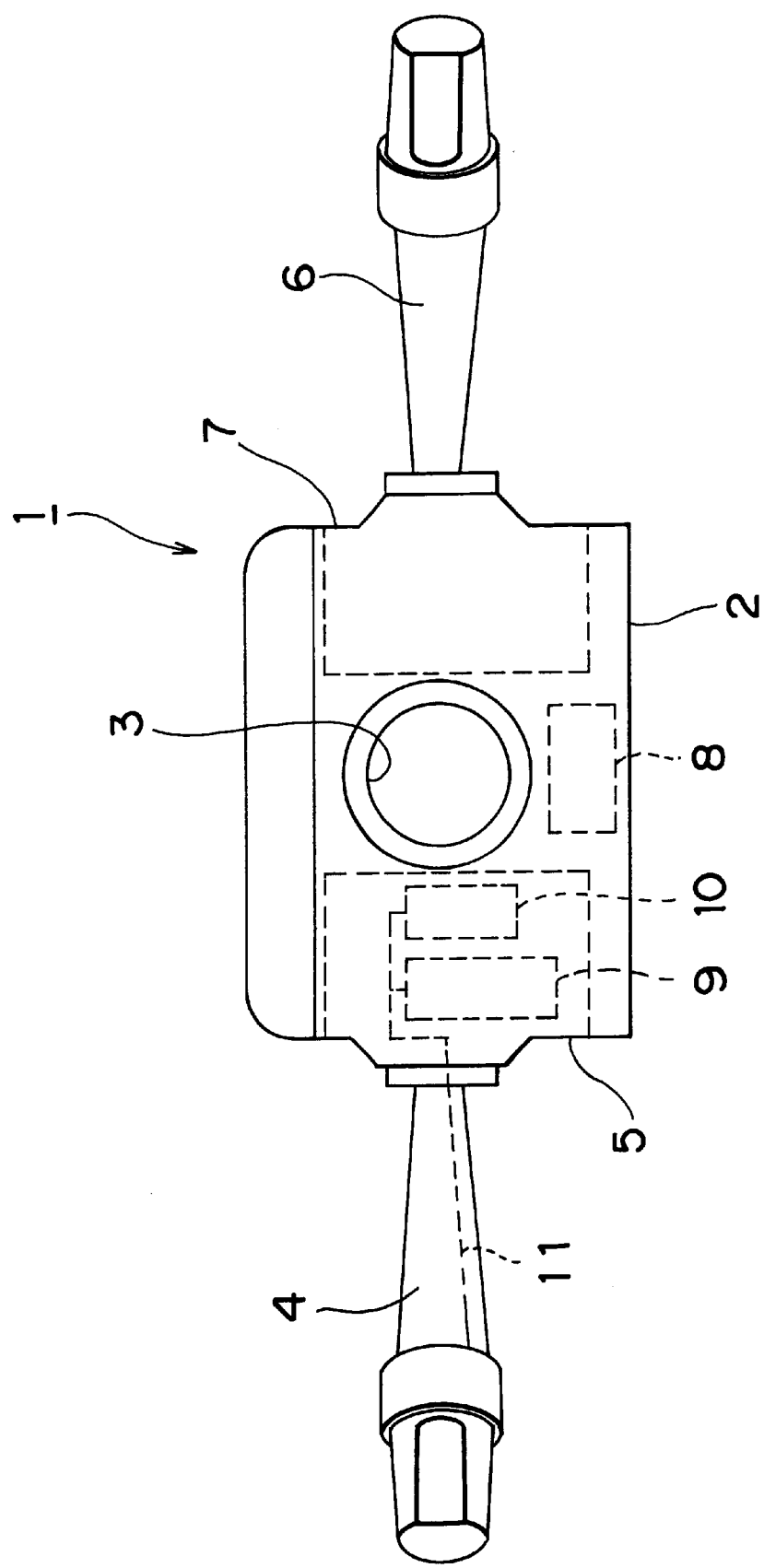
FIG. 1 is a plan of a lever combination switch unit related to the first embodiment of the present invention.
Figure 2:
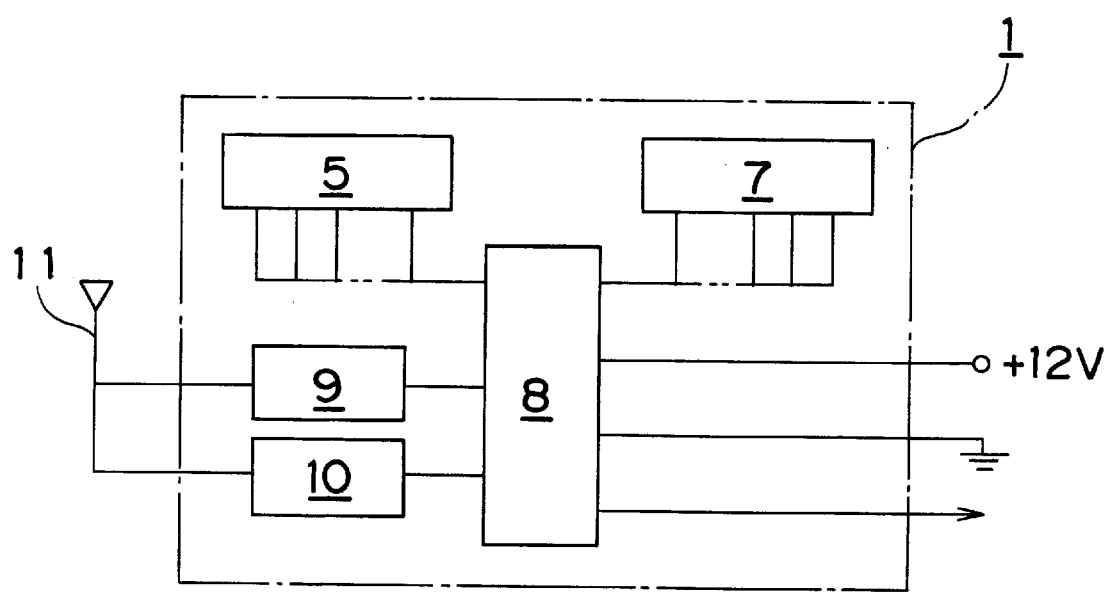
FIG. 2 is an outline of a schematic block diagram showing the electrical relationship among the respective components of the lever combination switch unit as shown in FIG. 1.

FIG. 1 is a plan of a lever combination switch unit 1 of an embodiment of the present invention. FIG. 2 is an outline of a schematic block diagram showing the electronic relationship among the respective components constituting the lever combination switch unit as shown in FIG. 1.

As is shown in FIG. 1, a through hole 3 is formed in the center of a switch body 2 to accommodate a steering shaft (not shown) of a vehicle. A wiper switch unit 5 installed with a wiper operation lever 4 is installed at the left side of the switch body 2, and a turn signal switch unit 7 installed with a turn signal operation lever 6 is installed at the right side of the switch body 2, as shown in FIG. 1. This embodiment is applied to a vehicle where the steering wheel is on the right side; that is, in a vehicle where the driver's seat is installed on the right side. The wiper operation lever 4 shown in FIG. 1 is positioned so that it is near the front passenger seat side.

A CPU 8 is incorporated into the lower portion of the switch body 2. A keyless reception circuit 9 for the keyless system and an anti-burglar amplifier circuit 10 for the anti-burglar system are incorporated within the wiper switch unit 5 of the switch body 2, which is installed on the left side of the vehicle (the side near the door next to the driver's seat).

As is shown in FIG. 2, the CPU 8 is electrically coupled to the wiper switch unit 5 and the turn signal switch unit 7, and further to the keyless reception circuit 9 and the anti-burglar amplifier circuit 10. The CPU 8 outputs a predetermined operation signal to the vehicle side in accordance with a predetermined program stored therein, based on a signal for switching the aforementioned wiper switch unit 5 and the turn signal switch unit 7, and the signal sent from the keyless reception circuit 9 and the anti-burglar amplifier circuit 10.

As is shown in FIG. 1, the keyless reception circuit 9 is coupled to an antenna 11 that receives an identification signal transmitted from an ignition key (not shown) having a transmitter. The identification signal is used, for example, to lock/unlock the vehicle doors, disconnect the lock mechanism of a trunk of the vehicle, and start the engine. The identification signal received by the antenna 11 is identified by the keyless reception circuit 9, and output to the CPU 8 as the operation signal for the respective operations as described above.

The antenna 11 for the keyless reception circuit 9 is positioned so that it is basically in a straight line within the wiper operation lever 4. The length of the antenna 11 is set at a predetermined length such that the identification signal transmitted from the ignition key can be received with excellent sensitivity.

The antenna 11 is also used for the anti-burglar amplifier circuit 10. Therefore the identification signal received by the antenna 11 is input to the anti-burglar amplifier circuit 10. The anti-burglar amplifier circuit 10 is allowed to decode only limited identification signals depending on the individual vehicle. Further, the signal indicating whether the input identification signal can be decoded is output to the CPU 8. If the identification signal transmitted from the ignition key can be identified by the anti-burglar amplifier circuit 10, the CPU 8 allows the respective operations of the aforementioned keyless system based on the signal from the anti-burglar amplifier circuit 10. If the identification signal transmitted from the ignition key cannot be identified by the anti-burglar amplifier circuit 10, the CPU 8 prevents the respective operations of the aforementioned keyless system, as well as operates the alarm system (not shown) installed in the vehicle, or prevents the starter circuit (not shown) from starting so as to protect the vehicle from the burglar.

In the aforementioned configuration of the lever combination switch unit 1, the signals for locking/unlocking the doors, opening the trunk, and starting the engine and so forth that have been transmitted from the ignition key outside the vehicle are received by the antenna 11 positioned within the wiper operation lever 4 and input to the keyless reception circuit 9. As the antenna 11 is positioned within the wiper operation lever 4, there are fewer obstacles between the ignition key outside the vehicle and the antenna 11 such as the seat or trunk of the vehicle. This makes it easier for the externally transmitted electric wave reach the antenna 11, thus ensuring the operating distance of the keyless system to be maintained. The antenna 11 is positioned within the wiper operation lever 4 installed at the switch body 2 of the vehicle and located near the front passenger seat side. Therefore the antenna 11 is capable of receiving the signal from the ignition key in every direction around the vehicle, being less influenced by the fewer obstacles, thus ensuring the operating distance to be maintained.

The present invention can be built as a compact multiplex communication type lever combination switch unit 1 as it is designed so that not only the wiper switch unit 5 and the turn signal switch unit 7 but also the keyless reception circuit 9 and the anti-burglar amplifier circuit 10 are integrally incorporated into the switch body 2, and a single unit of the CPU 8 processes the switching signal of the wiper switch unit 5 and the turn signal switch unit 7, and the signal transmitted from the keyless reception circuit 9 and the anti-burglar amplifier circuit 10. Furthermore, the case for the circuits and the installation bracket may be eliminated. As a result, the arrangement of the wire harness connecting the respective circuits can be simplified and the amount of space and number of man-hours for the incorporation work can be reduced, thus reducing the cost. Further, the number of man-hours for evaluation can be reduced by maintaining the keyless operation distance.

The lever combination switch unit 1 of the aforementioned embodiment was applied to a vehicle having the driver's seat on the right side. However, it can also be applied to a vehicle having the driver's seat on the left side. In this case, it is preferable to install the antenna 11 at the wiper operation lever or the turn signal operation lever whichever is nearer the front passenger seat side. The antenna can be installed both at the wiper operation lever and the turn signal operation lever for the purpose of improving receiving sensitivity.

In the aforementioned embodiment, a signal is transmitted to the antenna 11 from a transmitter incorporated into the ignition key. Alternatively, the transmitter can be separated from the ignition key as an independent element.

In this embodiment, the antenna 11 for the keyless reception circuit 9 can also be used as the antenna for the anti-burglar amplifier circuit 10. Alternatively, it can be so designed to be used as the antenna for an engine starter system, which receives signals transmitted from the transmitter outside the vehicle for remotely starting the engine.

What is claimed is:

1. A lever combination switch unit, comprising:
    a switch body;
    an operation lever installed at either the right or left side of said switch body, wherein said operation lever is a wiper operation lever for operating a wiper unit of a vehicle; and
    an antenna for a keyless reception circuit incorporated into said operation lever.

2. A lever combination switch unit, comprising:
    a switch body;
    an operation lever installed at either the right or left side of said switch body, wherein said operation lever is a turn signal operation lever for operating a turn signal of a vehicle; and
    an antenna for a keyless reception circuit incorporated into said operation lever.

3. A lever combination switch unit, comprising:
    a switch body;
    an operation lever installed at either the right or left side of said switch body, wherein said operation lever is installed at the right or the left side of said switch body, whichever is nearer the front passenger seat side of a vehicle; and
    an antenna for a keyless reception circuit incorporated into said operation lever.

4. A lever combination switch unit, comprising:
    a switch body;
    a first operation lever of a vehicle installed at either the right or left side of said switch body;
    a first antenna for a keyless reception circuit incorporated into said first operation lever; and
    a second operation lever of a vehicle installed at the right or the left side of said switch body, whichever is the opposing side of said first operation lever, wherein:
    said keyless reception circuit is provided with a second antenna, and
    said second antenna is incorporated into said second operation lever.

5. A lever combination switch unit, comprising:
    a switch body, wherein a keyless reception circuit is incorporated into said switch body;

an operation lever of a vehicle installed at either the right or left side of said switch body; and an antenna for said keyless reception circuit incorporated into said operation lever.

6. A lever combination switch unit according to claim 5, wherein a wiper switch unit for controlling an operation state of said wiper switch unit of a vehicle is installed at said switch body, and said keyless reception circuit is incorporated into said wiper switch unit.

7. A lever combination switch unit, comprising:

a switch body;

an operation lever of a vehicle installed at either the right or left side of said switch body; and an antenna for a keyless reception circuit incorporated into said operation lever, wherein said antenna for said keyless reception circuit is also used as an antenna for an anti-burglar amplifier circuit.

8. A lever combination switch unit according to claim 7, wherein said anti-burglar amplifier circuit is incorporated into said switch body.

9. A lever combination switch unit according to claim 6, wherein said wiper switch unit for controlling an operation state of said wiper unit of a vehicle is installed at said switch body, and an anti-burglar amplifier circuit is incorporated into said wiper switch unit.

10. A lever combination switch unit, comprising:

a switch body;

an operation lever of a vehicle installed at either the right or left side of said switch body; and an antenna for a keyless reception circuit incorporated into said operation lever, wherein said antenna is linearly positioned within said operation lever.

* * * * *